US009256892B2

(12) United States Patent
Kniaz et al.

(10) Patent No.: US 9,256,892 B2
(45) Date of Patent: Feb. 9, 2016

(54) CONTENT SELECTION USING PERFORMANCE METRICS

(71) Applicant: Google Inc., Mountain View, CA (US)

(72) Inventors: Rob Kniaz, San Francisco, CA (US); Abinhay Sharma, Los Altos, CA (US); Kai Chen, Brisbane, CA (US); Maxim Drobintsev, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/281,370

(22) Filed: May 19, 2014

(65) Prior Publication Data

US 2014/0258005 A1   Sep. 11, 2014

Related U.S. Application Data

(63) Continuation of application No. 13/589,395, filed on Aug. 20, 2012, now Pat. No. 8,768,740, which is a continuation of application No. 11/948,886, filed on Nov. 30, 2007, now Pat. No. 8,249,908.

(60) Provisional application No. 60/868,072, filed on Nov. 30, 2006.

(51) Int. Cl.
 *G06Q 30/02* (2012.01)

(52) U.S. Cl.
 CPC ........... *G06Q 30/0277* (2013.01); *G06Q 30/02* (2013.01); *G06Q 30/0201* (2013.01); *G06Q 30/0273* (2013.01)

(58) Field of Classification Search
 CPC ................................................ G06F 30/0277
 See application file for complete search history.

(56) References Cited

U.S. PATENT DOCUMENTS

| 5,371,673 A | 12/1994 | Fan |
| 5,617,538 A | 4/1997 | Heller |
| 5,724,521 A | 3/1998 | Dedrick |
| 5,727,129 A | 3/1998 | Barrett et al. |

(Continued)

FOREIGN PATENT DOCUMENTS

| JP | 410117156 | 5/1998 |
| JP | 2002-140359 A | 5/2002 |

(Continued)

OTHER PUBLICATIONS

AdForce, Inc., A Complete Guide to AdForce, Version 2.6, 1998.

(Continued)

*Primary Examiner* — Thomas Dixon
(74) *Attorney, Agent, or Firm* — Fish & Richardson P.C.

(57) ABSTRACT

Methods, systems, and apparatus, including computer programs encoded on a computer program product, for selecting advertisements. In one aspect, a method includes receiving publisher selections of advertisements; associating the selected advertisements with an advertisement environment in a document; generating an advertisement request code for inclusion in the document; evaluating performance metrics for the selected advertisements; and in response to determining that the selected advertisements do not meet the performance threshold, optimizing the selection of selected advertisements based on the performance metrics; substituting a selected advertisement with a candidate advertisement and causing a client device to render the candidate advertisement in the advertisement environment in the document.

12 Claims, 9 Drawing Sheets

(56) References Cited

U.S. PATENT DOCUMENTS

| | | | |
|---|---|---|---|
| 5,740,549 | A | 4/1998 | Reilly et al. |
| 5,809,471 | A | 9/1998 | Brodsky |
| 5,809,481 | A | 9/1998 | Baron et al. |
| 5,848,397 | A | 12/1998 | Marsh et al. |
| 5,873,068 | A | 2/1999 | Beaumont et al. |
| 5,884,305 | A | 3/1999 | Kleinberg et al. |
| 5,937,037 | A | 8/1999 | Kamel et al. |
| 5,937,392 | A | 8/1999 | Alberts |
| 5,948,061 | A | 9/1999 | Merriman et al. |
| 6,006,197 | A | 12/1999 | D'Eon et al. |
| 6,026,368 | A | 2/2000 | Brown et al. |
| 6,044,376 | A | 3/2000 | Kurtzman, II |
| 6,078,914 | A | 6/2000 | Redfern |
| 6,128,651 | A | 10/2000 | Cezar |
| 6,144,944 | A | 11/2000 | Kurtzman, II et al. |
| 6,161,127 | A | 12/2000 | Cezar et al. |
| 6,167,382 | A | 12/2000 | Sparks et al. |
| 6,182,059 | B1 | 1/2001 | Angotti et al. |
| 6,269,361 | B1 | 7/2001 | Davis et al. |
| 6,401,075 | B1 | 6/2002 | Mason et al. |
| 6,654,725 | B1 | 11/2003 | Langheinrich et al. |
| 6,836,773 | B2 | 12/2004 | Tamayo et al. |
| 6,895,387 | B1 | 5/2005 | Roberts et al. |
| 6,907,566 | B1 | 6/2005 | McElfresh et al. |
| 6,915,271 | B1 | 7/2005 | Meyer et al. |
| 6,954,731 | B1 | 10/2005 | Montague |
| 6,985,882 | B1 | 1/2006 | Del Sesto |
| 7,039,599 | B2 | 5/2006 | Merriman |
| 7,100,111 | B2 | 8/2006 | McElfresh et al. |
| 7,130,808 | B1 | 10/2006 | Ranka et al. |
| 7,136,875 | B2 | 11/2006 | Anderson et al. |
| 7,603,619 | B2 | 10/2009 | Baugher |
| 7,685,197 | B2 | 3/2010 | Fain et al. |
| 2002/0010757 | A1 | 1/2002 | Granik et al. |
| 2002/0042739 | A1 | 4/2002 | Srinivasan et al. |
| 2002/0099600 | A1 | 7/2002 | Merriman et al. |
| 2002/0103698 | A1 | 8/2002 | Cantrell |
| 2002/0178445 | A1 | 11/2002 | Eldering et al. |
| 2002/0188508 | A1 | 12/2002 | Lee et al. |
| 2003/0163372 | A1 | 8/2003 | Kolsy |
| 2003/0195837 | A1 | 10/2003 | Kostic et al. |
| 2003/0229537 | A1 | 12/2003 | Dunning et al. |
| 2004/0054589 | A1 | 3/2004 | Nicholas et al. |
| 2004/0237089 | A1 | 11/2004 | The et al. |
| 2005/0010644 | A1 | 1/2005 | Brown et al. |
| 2005/0039206 | A1 | 2/2005 | Opdycke |
| 2007/0055566 | A1 | 3/2007 | Gaughan et al. |
| 2008/0127208 | A1 | 5/2008 | Bedi et al. |
| 2009/0240780 | A1 | 9/2009 | Brown et al. |

FOREIGN PATENT DOCUMENTS

| | | |
|---|---|---|
| JP | 2004295379 | 10/2004 |
| WO | WO 97/21183 | 6/1997 |

OTHER PUBLICATIONS

AdForce, Inc., S-1/A SEC Filing, May 6, 1999.
AdKnowledge Campaign Manager: Reviewer's Guide, AdKnowledge, Aug. 1998.
AdKnowledge Market Match Planner: Reviewer's Guide, AdKnowledge, May 1998.
Ad-Star.com website archive from www. Archive.org, Apr. 12, 1997 and Feb 1, 1997.
Baseview Products, Inc., AdManagerPro Administration Manual v. 2.0, Dec. 1998.
Baseview Products, Inc., ClassManagerPro Administration Manual v. 1.0.5, Feb. 1, 1997.
Business Wire, "Global Network, Inc. Enters Into Agreement in Principle With Major Advertising Agency," Oct. 4, 1999.
Information Access Technologies, Inc., Aaddzz brochure, "The Best Way to Buy and Sell Web Advertising Space," © 1997.
Information Access Technologies, Inc., Aaddzz.com website archive from www. Archive.org, archived on Jan. 30, 1998.
Zeff, R. et al., Advertising on the Internet, 2nd Ed., John Wiley & Sons, 1999.
Dedrick, R., Interactive Electronic Advertising, IEEE, 1994.
Dedrick, R., A Consumption Model for Targeted Electronic Advertising, Intel Architecture Labs, IEEE, 1995.
Request for Reexamination of U.S. Pat. No. 7,240,025 B2, Control No. 95/001,073.
Request for Reexamination of U.S. Pat. No. 6,446,045 B1, Control No. 95/001,061.
Request for Reexamination of U.S. Pat. No. 7,249,059 B2, Control No. 95/001,069.
Request for Reexamination of U.S. Pat. No. 6,829,587 B2, Control No. 95/001,068.
Aptex Software Inc.—SelectCast for Commerce Servers., http://www.aptex.com/products-selectcast-commerce.htm. 1998, 1 page.
Langheinrich et al., "Unintrusive customization techniques for Web advertising," Computer Networks 31 (1999) 1259-1272.
Langheinrich et al., "Unintrusive Customization Techniques for Web Advertising" NEC Corporation, C&C Media Research Laboratories, Japan, publication date unknown, 33 pages.
Campbell, Lisa, "Net Worth. (Internet Advertising)", The Gale Group, May 28, 1998, Marketing, 8 pages.
Romano, Catherine, "The New Gold Rush?", Management Review; vol. 84, Issue 11, p. 19, Nov. 1995, Academic Journal.
Authorized officer Joon Sung Lee, International Search Report and Written Opinion in PCT/US2007/086183, mailed Apr. 25, 2008, 11 pages.
Authorized officer Nora Lindner, International Preliminary Report on Patentability in PCT/US2007/086183, mailed Jun. 11, 2009, 7 pages.

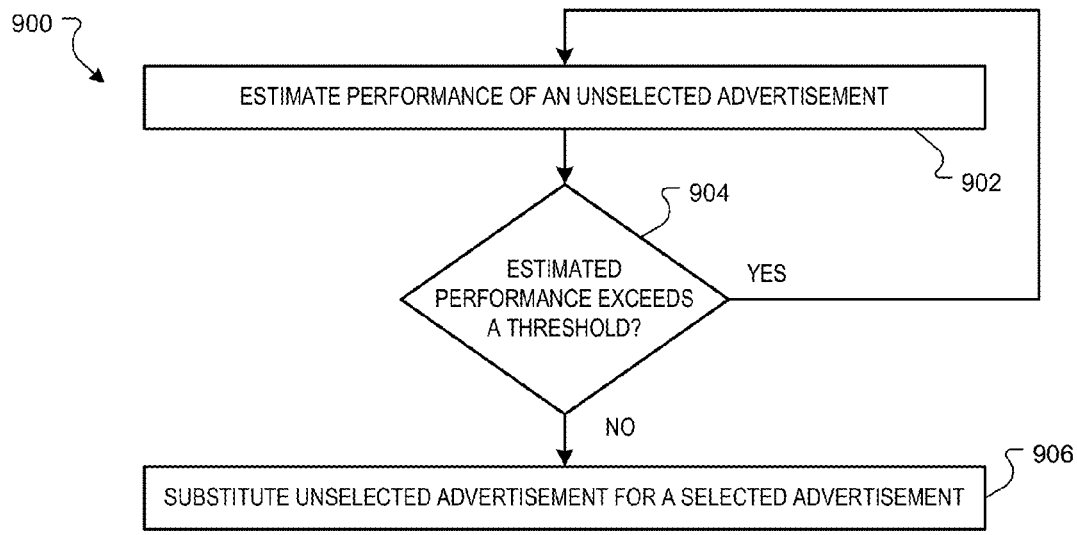
FIG. 9
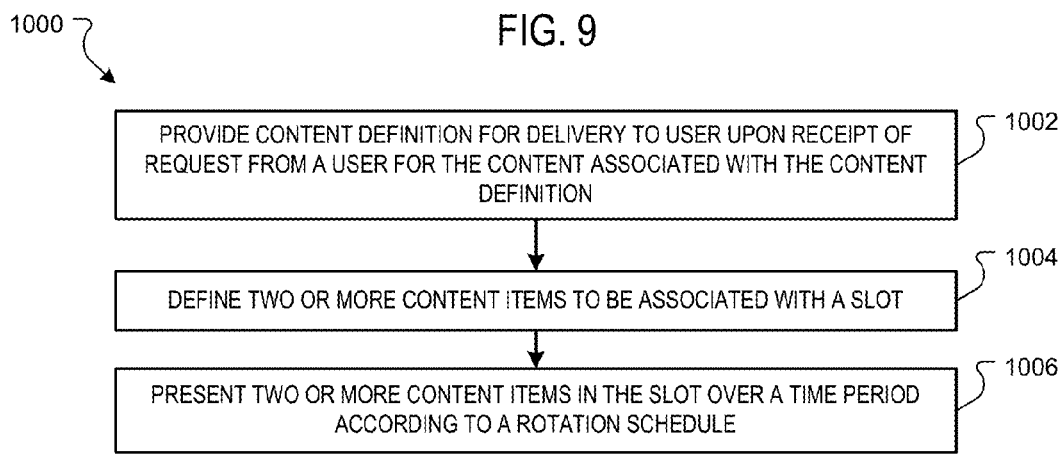
FIG. 10
FIG. 11

Referrals — 1400

Choose referrals » Get Ad Code

AdSense Referrals allow you to choose which products and services you want to advertise for. You can also choose a broad category of products, or use our powerful context-targeting to choose which products are best suited for your site.

You can choose from a number of referral items, and create an ad unit to display a single product or a blend of multiple products. Search or browse for the item(s) you'd like to refer.

Show referrals available for: [All countries] — 1402    In creative language: [English (US)] — 1404

Search for referrals

Enter a product name or keyword

[          ] [Search] — 1406

View just Google referrals »
View all referrals »

Browse all referrals — 1408

| Business Services (52) | Finance (52) | Recreation (33) |
| Electronics (4) | Healthcare (63) | Technology (55) |
| Entertainment (2698) | Other (92) | Telecommunications (19) |
| Education, Religion (21) | Real Estate (21) | Travel (294) |

Top referrals for sites like mine — 1410

| Name | eCPM [?] |
| XYA MP3 Player | $14.12 |

What's new and relevant

| Name | eCPM [?] |
| Best Bleach | $5.25 |

— 1412

Your chosen referrals — 1420

[          ] — 1422

Choose format: [Text link ▾] — 1424

No specific referrals chosen
Defaults to contextual

Channel: [No channel selected ▾]
Add new channel

[Get code »] — 1426

CONTENT SELECTION USING PERFORMANCE METRICS

CROSS-REFERENCE TO RELATED APPLICATIONS

This application is a continuation of U.S. application Ser. No. 13/589,395, filed Aug. 20, 2012, which is a continuation of U.S. application Ser. No. 11/948,886, filed Nov. 30, 2007, which claims the benefit of U.S. Provisional Application No. 60/868,072, filed Nov. 30, 2006. The entire disclosure of all of the prior applications is hereby incorporated by reference.

FIELD

This disclosure relates generally to online advertising.

BACKGROUND

Content displayed on web pages can be generated by one or more content servers in response to content requests. The content requests can be generated during the rendering of a web page by a client device. For example, advertisements generated on a web page published by a publisher can be generated by an advertisement server. These advertisements are traditionally retrieved using a scripting language, such as JavaScript, and rendered in a browser on a client device. Each such location for an advertisement is typically referred to as an advertisement slot. The script that the publisher adds to a page for an advertisement slot to be retrieved is referred to as a snippet. Typically, the publisher is provided with a snippet generated by the advertisement server, which is then inserted into the web page. When a client browser visits a publisher's page, e.g., requests and receives the web page data for rendering, the client browser encounters the inserted snippets, which upon execution instructs the browser to transmit an advertisement request to the advertisement server. The advertisement server processes the snippet and returns to the client browser the advertisement content to be displayed on the publisher's page. The retrieved advertisement content is used to fill the advertisement slot.

Publishers, however, have many disparate advertisements competing for selection in a particular advertisement slot, and thus advertisement selection schemes have been developed. Publishers can, for example, rely on context-based advertisement targeting. However, context-based advertisement targeting does not by itself allow a publisher to express preferences over which ads to show with the content.

SUMMARY

In one aspect, a process for targeting content information can include defining an environment in a document, defining at least one targeting criterion for the environment, and storing in the document request code that is configured to request content for placement in the environment based on the targeting criterion. The environment in the document and the at least one targeting criterion are defined by a publisher of the document. Other embodiments of this aspect include corresponding systems, apparatus, computer program products, and computer readable media.

In another aspect, a process for targeting content information can include defining an advertisement environment in a document, selecting advertisements from a plurality of advertisements, associating the selected advertisements with an advertisement environment, and storing advertisement request code in the document. The advertisement request code can be configured to issue an advertisement request to an ad server. The ad server selects from one of the selected advertisements an advertisement for presentation in the advertisement environment. Other embodiments of this aspect include corresponding systems, apparatus, computer program products, and computer readable media.

In another aspect, a process for targeting content information can include receiving publisher selections of advertisements from a plurality of advertisements, associating the selected advertisements with an advertisement environment in a document, and generating advertisement request code for inclusion in the document. The advertisement request code can be configured to issue an advertisement request for selection of an advertisement from the selected advertisements for presentation in the advertisement environment. Other embodiments of this aspect include corresponding systems, apparatus, computer program products, and computer readable media.

In another aspect, a process for targeting content information can include providing a content definition including one or more slots for content items to be delivered to a user upon receipt of a request from a user for the content associated with the content definition, and defining two or more content items to be associated with a slot. Other embodiments of this aspect include corresponding systems, apparatus, computer program products, and computer readable media.

In another aspect, a process for targeting content information can include identifying a content page, the content page including a slot for indeterminate content, and defining a number of different content elements to be presented in the slot over a time period such that at each request of the content page only one of the different content elements is presented in the slot. Other embodiments of this aspect include corresponding systems, apparatus, computer program products, and computer readable media.

In another aspect, a process for targeting content information can include identifying a content page, the content page including a slot for indeterminate content, defining a number of different content elements to be presented in the slot over a time period such that at each request of the content page only one of the different content elements is presented in the slot, explicitly selecting at least one content element to be presented in the slot, implicitly selecting at least one content element to be presented in the slot, and incorporating code that includes the number and data associated with the explicit and implicit selections into the content page, such that at the time the page is rendered, the slot is filled with one of the different content elements. Other embodiments of this aspect include corresponding systems, apparatus, computer program products, and computer readable media.

BRIEF DESCRIPTION OF THE DRAWINGS

FIG. 9 is a flow diagram of another example process for optimizing the selection of content items.

FIG. 10 is a flow diagram of an example process for presenting multiple content items associated with a single slot.

FIG. 11 is a flow diagram of another example process for optimizing the selection of content items.

FIG. 14 is a screenshot of another example content management user interface.

FIG. 15 is a screenshot of another example content management user interface.

The details of one or more embodiments of the subject matter described in this specification are set forth in the accompanying drawings and the description below. Other features, aspects, and advantages of the subject matter will become apparent from the description, the drawings, and the claims.

DETAILED DESCRIPTION

Figure 1:
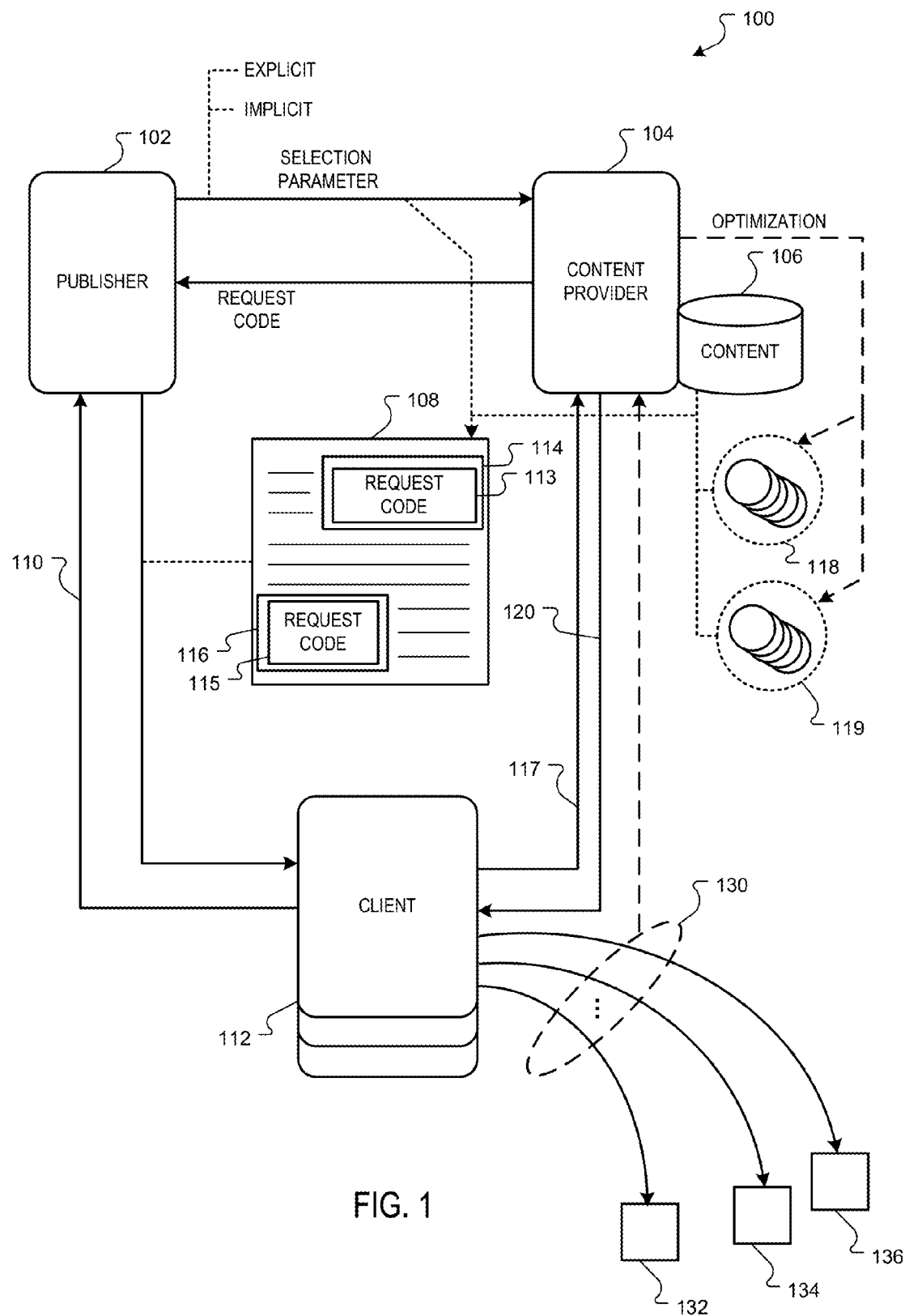
FIG. 1 is a block diagram of an example content request system.

FIG. 1 is a block diagram of an example content request system 100. Though a client-server system is described, other system architectures are possible. A publisher 102 can be in data communication with a content provider 104 that provides content 106 in response to content requests. In one implementation, the content provider 104 can comprise an advertisement provider that serves advertisements in response to advertisement requests. Different types (e.g., weather, driving directions, trivia, etc.) and forms (e.g., media, multimedia, audio, images, documents, etc.) of content can also be requested.

The publisher 102 can, for example, provide a document 108 to clients 112 in response to requests 110 from the clients 112. Example documents include any machine-readable and machine-storable work product. A document can, for example, comprise a file, a combination of files, one or more files with embedded links to other files, etc. The files can be of any type, such as text, audio, image, video, hyper-text markup language documents, etc. In the context of the Internet, a common document is a web page. Web pages often include content and may include embedded information (such as meta information, hyperlinks, etc.) and/or embedded instructions (such as JavaScript, etc.). In many cases, a document has a unique, addressable storage location and can therefore be uniquely identified by this addressable location.

The document 108 can include an embedded request code 113 and 115 for content environments 114 and 116, such as JavaScript code snippets 113 and 115 for advertisement slots 114 and 116, respectively. Upon rendering the document 108, the clients 112 execute the request code 113 and 115, which causes the clients 112 to issue content requests 117, e.g., advertisement requests, to the content provider 104. The content provider 104 can select content items from the content data store 106 and provide the content items to the clients 112 by responses 120.

In an implementation, the selection of content items for a content item environment (e.g., advertisements for an advertisement slot) can be facilitated by the request code 113 and 115. In an implementation, the publisher 102 provides one or more selection parameters to the content provider 104. The selections parameters can, for example, define one or more content item selection parameters. In an implementation, the selection parameters can, for example, comprise an explicit parameter. An explicit parameter can associate particular content items with a content environment. For example, explicit parameters can be used by the publisher 102 to select multiple advertisements for association with and display within an advertisement slot.

In another implementation, the selection parameters can, for example, comprise implicit parameters. An implicit parameter can associate content items of a particular type or association with a content environment. For example, an implicit parameter can include one or more key words that can be used to search an advertisement database for relevant advertisements. By way of another example, an implicit parameter can be a business vertical, e.g., "cars" or "computers," that can be used to search an advertisement database for relevant advertisements. Other types of implicit parameters can also be used (e.g., parameters that select a particular content provider (e.g., advertiser) without specifically defining a particular content item).

In another implementation, the selection parameter can comprise sequence parameters. A sequence parameter can define a presentation sequence or rotation to which relevant advertisements are to be presented. For example, if a publisher 102 selects four advertisements to be presented in an advertisement slot, the publisher 102 can also define a sequence by which the four advertisements are to be presented. In one implementation, a sequence parameter can comprise time-based criterion. For example, a publisher 102 can specify that a first advertisement is to be presented during weekday afternoons in an advertisement slot; that a second advertisement be presented during weeknights in the advertisement slot; and that any of the four advertisements be randomly selected for presentation in the advertisement slots during the weekend.

In another implementation, a sequence parameter can comprise distribution-based criteria. For example, a publisher 102 can specify that a first advertisement be presented in the advertisement slot least 40% of the time, and that each of the remaining three advertisements be presented in the advertisement slot 20% of the time. Other distribution-based criteria can also be used. For example, a sequence parameter can be defined to provide an even distribution of identified advertisements in a slot over a defined time period. In another implementation, sequencing and distribution can be determined by the content server (e.g., automatically without publisher input).

In another implementation, a selection parameter can comprise context-selection criteria. Context-selection criteria can be used to instruct the content provider 104 to select an advertisement based on the content of the document 108. For example, a publisher 102 can specify that a particular advertisement slot receive advertisements that are selected based on the content of the document 108.

In an implementation, a document 108 having more than one content environment can have different selection parameters associated with each content environment. For example, an implicit parameter can be used for the selection of advertisements for the advertisement slot 114, while an implicit parameter and a sequence parameter can be used for the selection of advertisements for the advertisement slot 116.

The use of one or more selection parameters and associating the selection parameters with corresponding content environments 114 and 116 can thus associate groups of targeted content items 118 and 119 with each respective content environment 114 and 116. For example, the group of targeted content items 118 can comprise several advertisements specifically selected by the publisher 102. Likewise, the group of targeted content items 119 can comprise a combination of explicitly selected content items and one or more dynamic advertisements that are relevant to one or more implicit parameters associated with the content item environment 116, e.g., one advertisements may comprise car advertisements if the implicit parameter associated with the content item environment 116 is the business vertical "cars."

A publisher 102 can specify the various selection parameters for corresponding content environments in a document 108 by the use of a content selection process. In one implementation, the content selection process can be instantiated at the content provider 104 and can be accessed by the publisher 102 through a user interface, such as a client interface. One or more of the selection parameters can be automatically set by the content serving system.

Upon receiving an input from the publisher 102 indicating that a content selection process is complete, the content provider can, for example, generate the corresponding request code 113 and 115 for the document 108. In one implementation, corresponding request code is provided to the publisher 102 for inclusion into the document 108. In another implementation, the publisher can submit the document 108 to the content provider 104, and the content provider can automatically modify the document 108 so that the document 108 includes the corresponding request code 113 and 115 for the content item environments 114 and 116. Thereafter, the publisher 102 can, for example, host the document 108 for serving to requesting clients 112. Execution of the request code 113 and 115 by the clients 112 thus results in the clients 112 requesting content items, e.g., advertisements, for the content item environments, e.g., advertisement slots 114 and 116, based on the selection parameters.

In one implementation, the content provider 104 can, for example, monitor the performance of the content items for each of the groups of content items 118 and 119 by a monitoring process 130. For example, the performance of each advertisement can be evaluated based on a performance metric, such as a click-through rate, a conversion rate, or some other performance metric. A click-through can occur, for example, when a user of a client 112 selects or "clicks" on an advertisement in the document 108. The click-through rate can be a performance metric that is obtained by dividing the number of users who clicked on the advertisement or a link associated with the advertisement by the number of times the advertisement was delivered. For example, if advertisement is delivered 100 times, and three persons clicked on the advertisement, then the click-through rate for that advertisement is 3%.

A "conversion" occurs when a user, for example, consummates a transaction related to a previously served advertisement. What constitutes a conversion may vary from case to case and can be determined in a variety of ways. For example, a conversion may occur when a user clicks on an advertisement, is referred to the advertiser's web page, such as web pages 132, 134 and 136, and consummates a purchase there before leaving that web page. Alternatively, a conversion may be defined as a user being shown an advertisement, and making a purchase on the advertiser's web page within a predetermined time (e.g., seven days). In yet another alternative, a conversion may be defined by an advertiser to be any measurable/observable user action such as, for example, downloading a white paper, navigating to at least a given depth of a website, viewing at least a certain number of web pages, spending at least a predetermined amount of time on a website or web page, registering on a website, dialing a telephone number, sending a product or service inquiry, etc. Often, if user actions don't indicate a consummated purchase, they may indicate a sales lead, although user actions constituting a conversion are not limited to this. Indeed, many other definitions of what constitutes a conversion are possible. A conversion rate can be defined as the ratio of the number of conversions to the number of impressions of the advertisement (i.e., the number of times an advertisement is rendered) or the ratio of the number of conversions to the number of selections (or the number of some other earlier event). The type of conversion rate can be apparent from the context in which it is used. If a conversion is defined to be able to occur within a predetermined time since the serving of an advertisement, one possible definition of the conversion rate might only consider advertisements that have been served more than the predetermined time in the past.

Other performance metrics can also be used. The performance metrics can, for example, be revenue related or non-revenue related. In another implementation, the performance metrics can be parsed according to time, e.g., the performance of a particular content item may be determined to be very high on weekends, moderate on weekday evenings, but very low on weekday mornings and afternoons, for example.

The monitoring process 130 can, for example, collect performance data and rank the performance of the content items of the groups 118 and 119. In one implementation, the performance of the content items can be evaluated against a performance threshold. In an implementation, if the performance of a particular content item does not meet the performance threshold, the content provider 104 can perform an optimization routine. An optimization routine can, for example, modify a group (or individual element of a group) of content items corresponding to a publisher's selection parameters. For example, in one implementation, if the performance of a particular content item does not meet a threshold, the content item can be eliminated from a group of selected content items. In another implementation, the selection of the content item according to a sequence parameter can be adjusted. In some implementations, one or more different content items (or referred below to as an "unselected content item") can be substituted for a content item that does not meet a threshold.

In another implementation, a performance of an unselected content item can be estimated. If the estimate performance exceeds the threshold, then a selected content item whose performance does not meet the threshold can be substituted with the unselected content item whose performance is estimated to meet the threshold.

In another implementation, a selection parameter can include an override parameter. The override parameter can, for example, allow or disallow the content provider 104 to override the selection parameters defined by the publisher 102. In certain situations, for example, a publisher may not desire optimization of a group of content items or optimization of a particular content item within a selected group of content items. For example, a publisher may contract with a third party to serve a particular advertisement for the third party in a particular advertisement slot at least 50% of the time. Accordingly, the publisher 102 may select an override parameter that prevents the content provider 104 from optimizing the particular advertisement. Thus, even if the particular advertisement performs poorly, the advertisement will still be served at least 50% of the time, as specified by the publisher's selection parameter definition. The publisher 102, however, can specify that the remaining advertisements in the group be optimized accordingly.

Figure 2:
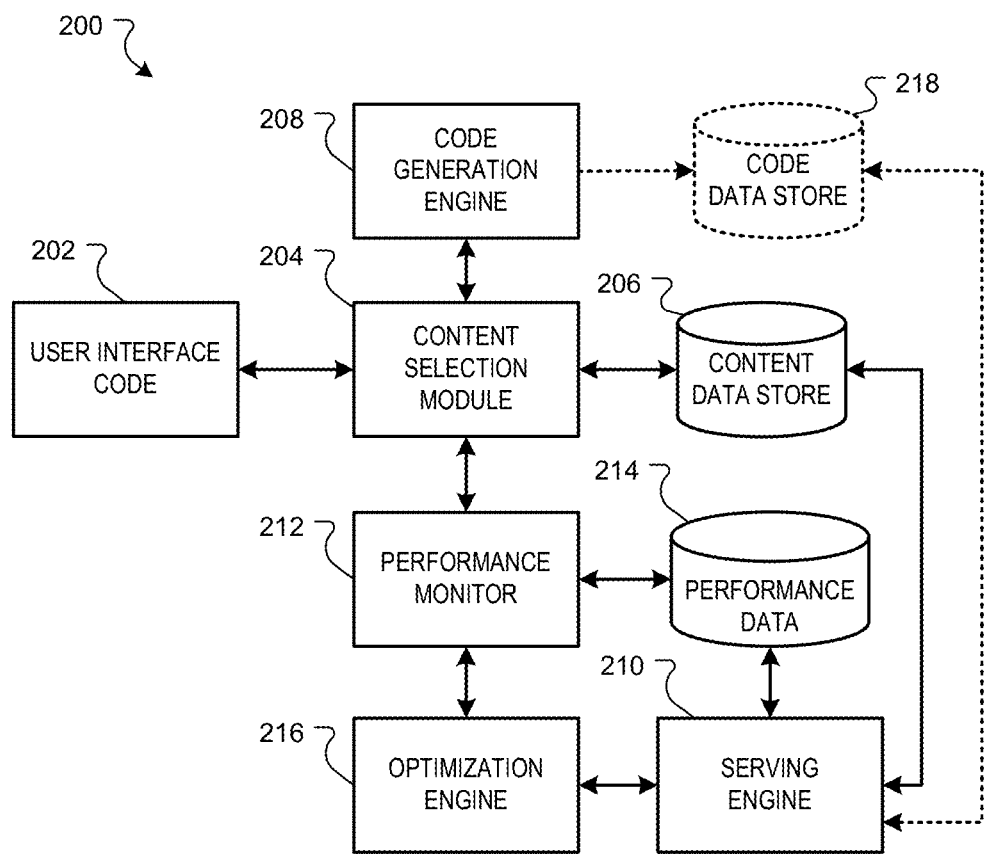
FIG. 2 is a block diagram of an example content request system.

FIG. 2 is a block diagram of an example content request system 200. The system 200 can be implemented in one or more computer systems, such as a number of server computers in a server farm. The system 200 includes user interface code 202 such as web document and code that can be provided to a requesting client to render a client-based user interface. In another implementation, the user interface code 202 can comprise an applet. Other implementations can also be used.

Execution of the user interface code 202 provides a publisher 102 access to content selection module 204. The content selection module 204 facilitates the selection and association of selection parameters and content items stored in a content item data store 206 (or other repository or source) with content item environments. For example, the content selection module 204 can associate advertisement targeting criterion with an advertisement slot, e.g., explicitly or implicitly selecting advertisements and associating the selected advertisements with an advertisement slot; defining a selection sequence or a rotation parameter for the serving and presentation of selected advertisements, etc.

The content request system 200 can also include a code generation engine 208. In one implementation, the code generation engine 208 is invoked after the publisher 102 indicates that a content selection process for a content environment is complete. In one implementation, the code generation engine 208 can generate corresponding request code, e.g., javascript, for inclusion into a document that includes the associated content item environment. In another implementation, the publisher 102 can submit the document to the content request system 200, and the code generation engine 208 can automatically modify the documents that the document includes the corresponding request code for the content item environment.

The content request system 200 can also include a serving engine 210. The serving engine 210 can, for example, be configured to receive content requests from clients executing the corresponding request code for a content item environment. The requests issued by the clients in response to executing the corresponding request code can, for example, be advertisement requests to select from one of a group of implicitly or explicitly selected advertisements an advertisement for presentation in the advertisement environment. In response to these requests, the serving engine 210 serves a requested content item, e.g., an advertisement.

The content request system 200 can also include a performance monitor 212 that can monitor the performance of content items for a corresponding content item environment. The performance monitor 212 can, for example, collect performance data 214, such as click-through rates, conversion rates, or other performance data.

An optimization engine 216 can be instantiated to optimize the group (or portion of a group) of selected content items if the performance of one or more content items in a selected group does not meet a performance threshold. The optimization engine 216 can, for example, modify a group of content items corresponding to a publisher's selection parameters. For example, in one implementation, if the performance of a particular content item does not meet a threshold, the content item can be eliminated from a group of selected content items. In another implementation, the selection of the content item according to a sequence parameter can be adjusted. Other optimizations can also be implemented.

Other implementations from the example implementations of FIGS. 1 and 2 can also be used. For example, while the example implementations of FIGS. 1-2 describe the generation of content request code for inclusion into a document, such as document 108, another implementation can maintain the content request code at the content request system 200, such as in a content request code data store 218. In this implementation, a unique identifier can be associated with each instance of request code stored in the content request code data store 218, and corresponding client request code snippets associated with content item environments are provided for inclusion into documents. Each client request code snippet can issue a content item request that includes the unique identifier. Accordingly, the server engine 210, upon receiving such requests, can access the content request code stored in the content request code data store 218.

Figure 3:
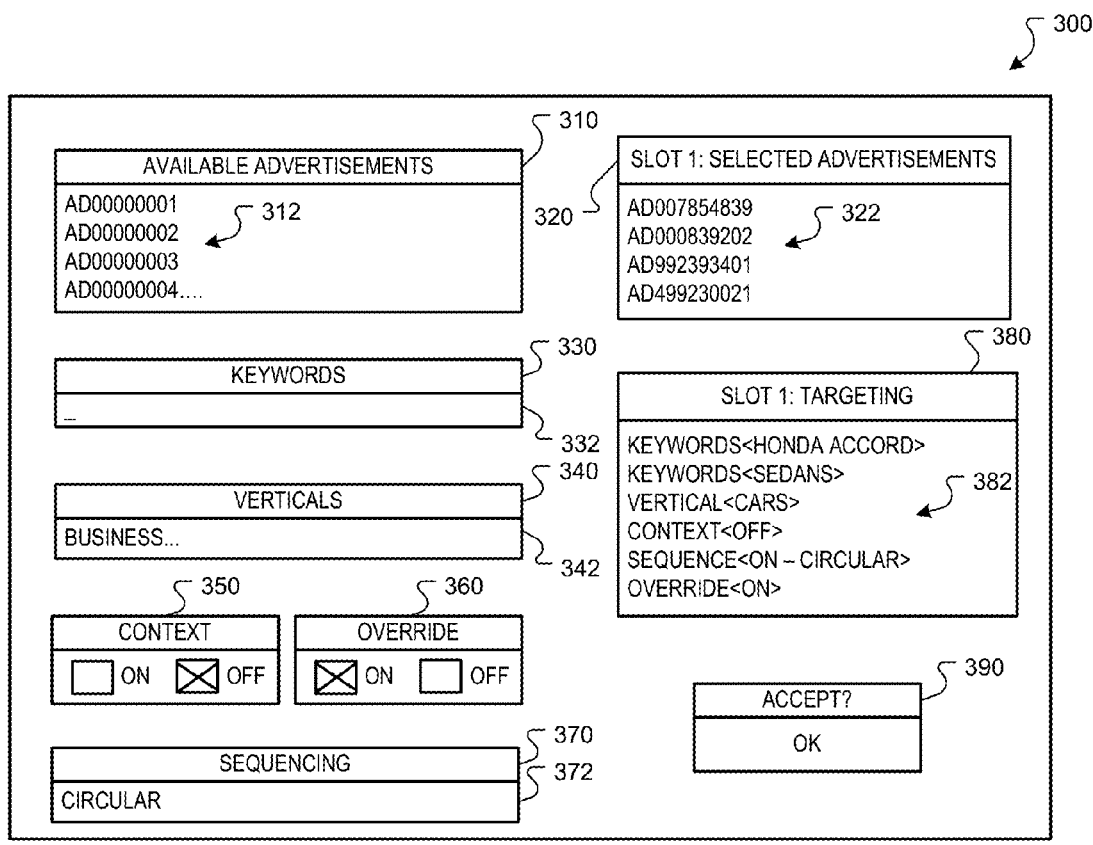
FIG. 3 is a screenshot of an example content management user interface.

FIG. 3 is a screenshot of an example content management user interface 300. The user interface 300 can, for example, be generated in response to executing the user interface code 202 of FIG. 2 and presented to a publisher of content for specification of selection parameters for a content item environment.

The example user interface 300 can, for example, include an available advertisements environment 310, an explicit environment 320, a keywords environment 330, a verticals environment 340, a content environment 350, an override environment 360, a sequencing environment 370, an implicit environment 380, and an accept input 390. Other environments can also be implemented.

The available advertisements environment 310 can, for example, include a list of advertisements 312 that are available for a user, e.g., the publisher 102, to select and associate with an advertisement slot. For example, the available advertisements 312 can comprise the corpus of advertisements stored in the content item data store 206 of FIG. 2.

The explicit environment 320 can, for example, list advertisements 322 that have been explicitly defined or associated with a content item environment, e.g., "Slot 1." As shown in FIG. 3, four advertisements have been explicitly associated with the advertisement slot "Slot 1."

The implicit environment 380 can, for example, list criteria or parameters 382 that implicitly define or associate advertisements with a content item environment, e.g. "Slot 1." The implicit criterion or parameters 382 are thus utilized to search for relevant advertisements, and thus the advertisements that will be served in response to corresponding advertisement requests are not explicitly defined.

Example implicit criteria or parameters can include keywords. The keyword environment 330 can, for example, be used to enter keywords in an input field 332.

Example implicit criteria or parameters can also include verticals. The vertical environment 340 can, for example, be used to select from a list of verticals in a selection list 342.

Example implicit criteria or parameters can also include a context parameter. The context environment 350 can, for example, be used to enter a context parameter, e.g., "ON" or "OFF." In an implementation, a context parameter of "ON" can, for example, allow the serving engine 210 of FIG. 2 to perform context-based advertisement selections for an advertisement slot based on a context derived from the document in which the advertisement slot is rendered. A context parameter of "OFF" can thus preclude such advertisement selection.

Example implicit criteria or parameters can also include an override parameter. The override environment 360 can, for example, be used to enter an override parameter, e.g., "ON" or "OFF." In an implementation, an override parameter of "ON" can, for example, allow the serving engine performance monitor 212 and optimization engine 216 of FIG. 2 to perform optimizations based on content item performance. An override parameter of "OFF" can thus preclude such optimizations for an entire group of advertisements, or for a selected advertisement. Other override parameters can be specified. For example, users can specify particular override parameters including thresholds for performance, exceptions (e.g., a list of content items in a group that are/or are not subject to override).

Example implicit criteria or parameters can also include a sequencing parameter. The sequencing environment 370 can, for example, be used to select a sequence from a list of sequences 372. The sequences can define serving sequences or criteria for the serving of selected advertisements. In one implementation, a sequence list can also be user defined. The sequencing parameter can include specification of sequence and distribution of each or individual content items in a group.

The accept input 390 can be selected by the user to indicate that a content selection process for a content environment is complete. In one implementation, selection of the accept input 390 can, for example, instantiate the code generation engine 208 of FIG. 2.

Figure 4:
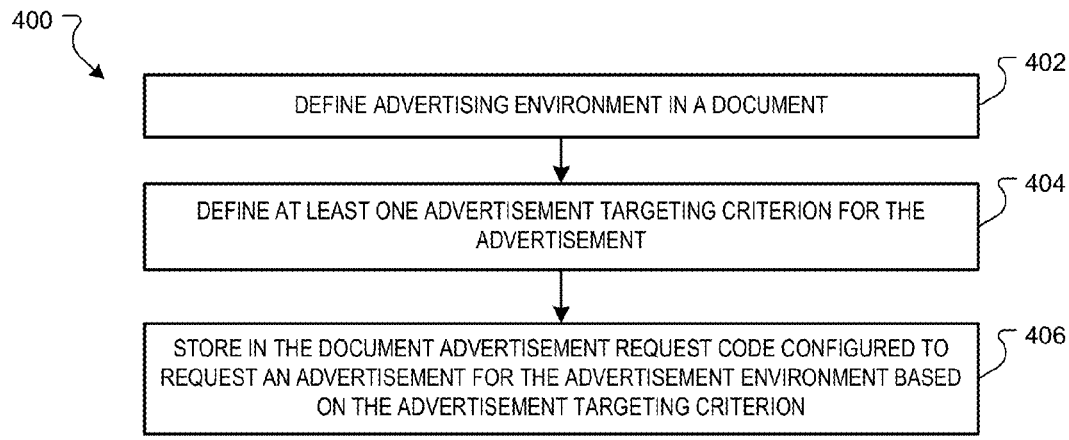
FIG. 4 is a flow diagram of an example process for generating content request code in a document.

FIG. 4 is a flow diagram of an example process 400 for generating content request code in a document. In one example implementation, execution of the user interface code 202 or the user interface 300 of FIG. 3 can be used to implement the process 400.

Stage 402 defines advertising environments in a document. For example, a publisher 102 can provide information related to an advertisement slot in a document to the content request system 200 through a user interface, such as the user interface 300 of FIG. 3.

Stage 404 defines at least one advertisement targeting criterion for the advertisement. For example, a publisher 102 can select one or more selection parameters for an advertisement slot through the user interface 300.

Stage 406 stores in the document advertisement request code configured to request an advertisement for the advertisement environment based on the advertisement targeting criterion. For example, a publisher 102 can store the advertisement request code in the document after receiving the advertisement request code through the user interface 300.

Figure 5:
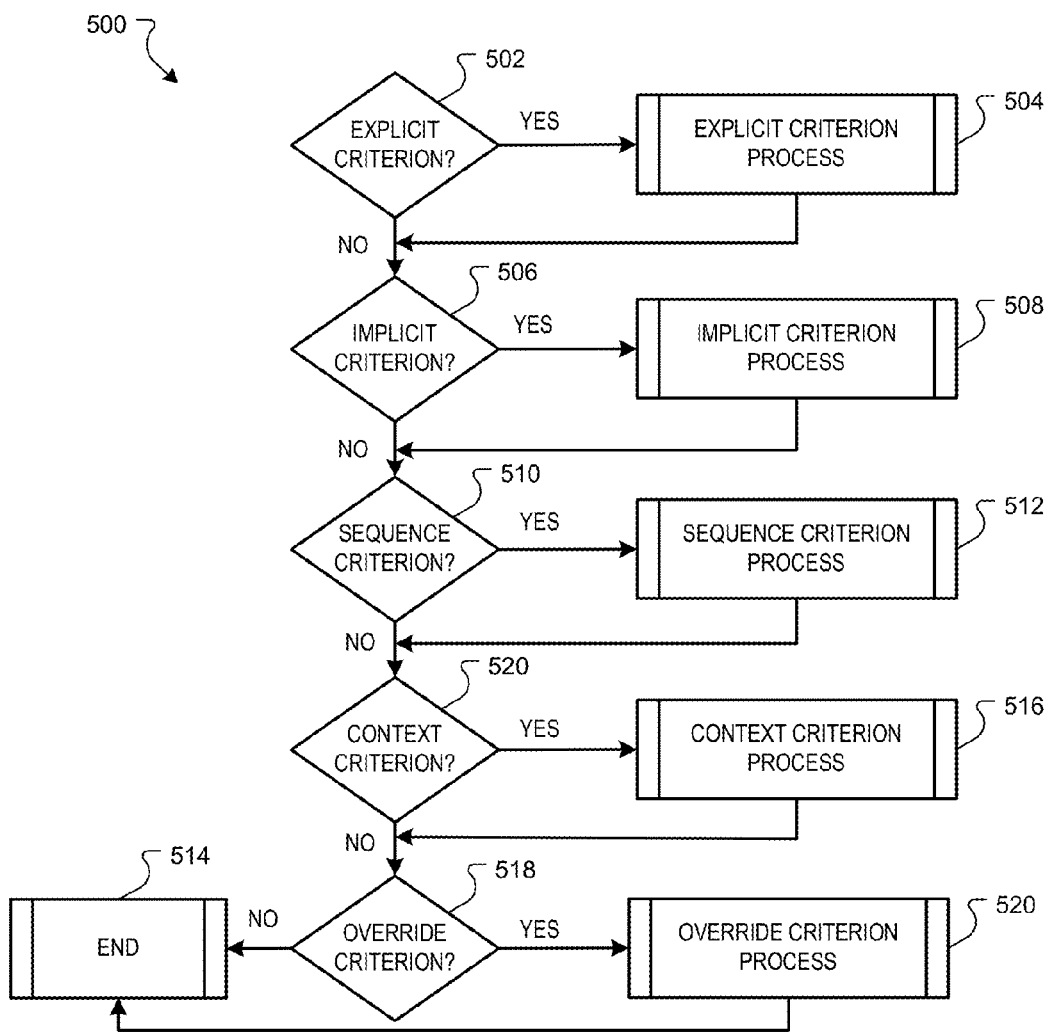
FIG. 5 is a flow diagram of an example process for defining targeting criteria.

FIG. 5 is a flow diagram of an example process 500 for defining targeting criteria. In one example implementation, the example content request system 200 of FIG. 2 can be used to implement the process 500.

Stage 502 determines if an explicit criterion has been selected. For example, the content selection module 204 can determine if an explicit criterion has been selected by a user through the user interface 300.

If an explicit criterion has been selected, then stage 504 executes an explicit criterion process 504. For example, the content selection module 204 can facilitate the explicit selection of content items from the content data store 206.

If an explicit criterion has not been selected, then stage 506 determines if an implicit criterion has been selected. For example, the content selection module 204 can determine if an implicit criterion has been selected by a user through the user interface 300.

If an implicit criterion has been selected, then stage 508 executes an implicit criterion process 508. For example, the content selection module 204 can facilitate the implicit selection of content items from the content data store 206.

If an implicit criterion has not been selected, then stage 510 determines if a sequence criterion has been selected. For example, the content selection module 204 can determine if a sequence criterion has been selected by a user through the user interface 300.

If a sequence criterion has been selected, then stage 512 executes a sequence criterion process 512. For example, the content selection module 204 can facilitate the selection of a sequence, such as a sequence from the list of sequences 372 shown in the sequence environment 370.

If a sequence criterion has not been selected, then stage 520 determines if a context criterion has been selected. For example, the content selection module 204 can determine if a context criterion has been selected by a user through the user interface 300.

If a context criterion has been selected, then stage 516 executes a context criterion process 516. For example, the content selection module 204 can facilitate the selection of a content selection criterion, e.g., "ON" or "OFF." The context criterion process can include the selection of one or more content items based on, for example, document contents or environment.

If a context criterion has not been selected, then stage 518 determines if an override criterion has been selected. For example, the content selection module 204 can determine if an override criterion has been selected by a user through the user interface 300.

If an override criterion has been selected, then stage 520 executes an override criterion process 520. For example, the content selection module 204 can facilitate the selection of an override criterion, e.g., "ON" or "OFF." The override criterion process can include the evaluation of the performance of one or more of the content items in a group and the substitution of one or more different content items (with or without estimates of performance).

If an override criterion has not been selected, then stage 514 ends the content selection process.

Figure 6:
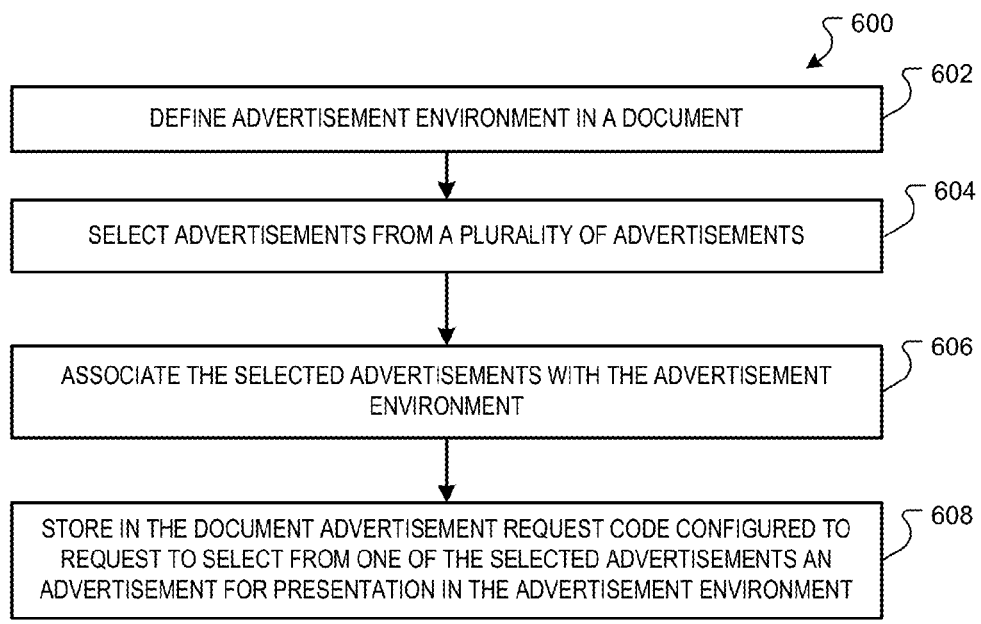
FIG. 6 is a flow diagram of another example process for generating content request code in a document.

FIG. 6 is a flow diagram of another example process 600 for generating content request code in a document. In one example implementation, execution of the user interface code 202 or the user interface 300 of FIG. 3 can be used to implement the process 600.

Stage 602 defines an advertisement environment in a document. For example, a publisher 102 can provide information related to an advertisement slot in a document to the content request system 200 through a user interface, such as the user interface 300 of FIG. 3.

Stage 604 selects advertisements from a plurality of advertisements. For example, a publisher 102 can implicitly or explicitly select advertisements through a user interface, such as the user interface 300 of FIG. 3.

Stage 606 associates the selected advertisements with the advertisement environment. For example, the implicitly or explicitly selected advertisements can be associated with an advertisement slot.

Stage 608 stores in the document advertisement request code(s) configured to request to select from one of the selected advertisements an advertisement for presentation in the advertisement environment. For example, a publisher 102 can store the advertisement request code in the document after receiving the advertisement request code through the user interface 300.

Figure 7:
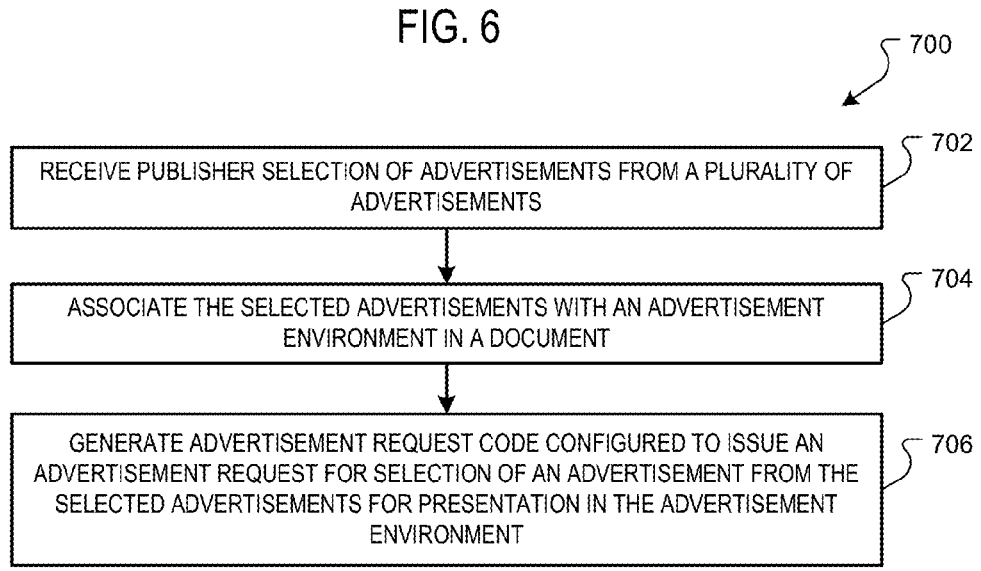
FIG. 7 is a flow diagram of another example process for generating content request code in a document.

FIG. 7 is a flow diagram of another example process 700 for generating content request code in a document. In one example implementation, the example content request system 200 of FIG. 2 can be used to implement the process 700.

Stage 702 receives publisher selection of advertisements from a plurality of advertisements. For example, the content selection module 204 can receive the publisher selection of advertisements.

Stage 704 associates the selected advertisements with an advertisement environment in a document. For example, the content selection module 204 can associate the selected advertisements with an advertisement slot.

Stage 706 generates advertisement request codes configured to issue an advertisement request for selection of an advertisement from the selected advertisements for presentation in the advertisement environment. For example, the code generation engine 108 can generate the advertisement request code.

Figure 8:
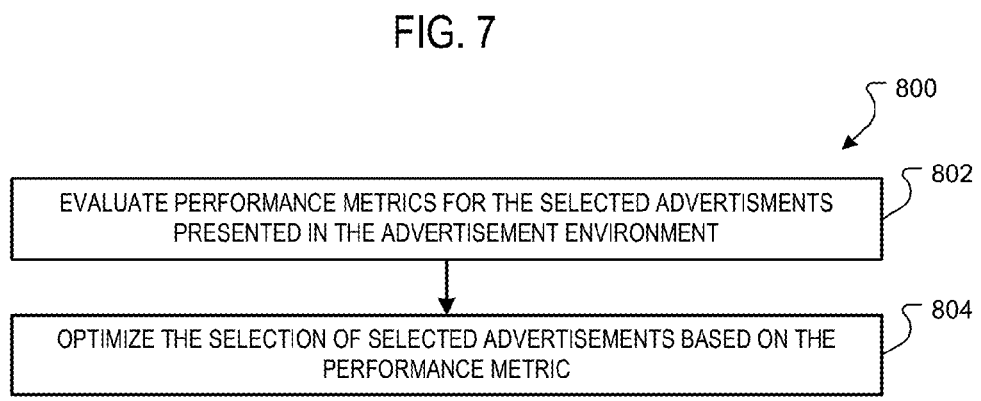
FIG. 8 is a flow diagram of an example process for optimizing the selection of content items.

FIG. 8 is a flow diagram of an example process 800 for optimizing the selection of content items. In one example implementation, the example content request system 200 of FIG. 2 can be used to implement the process 800.

Stage 802 evaluates one or more performance metrics for the selected advertisements presented in the advertisement environment. For example, the performance monitor 212 can be used to evaluate performance metrics for selected advertisements that are served by the serving engine 210.

Stage 804 optimizes the selection of selected advertisements based on the performance metric. For example, the optimization engine 216 can be used to optimize the selection of selected advertisements if the performance of the selected advertisements does not meet a performance threshold.

FIG. 9 is a flow diagram of another example process 900 for optimizing the selection of content items. In one example implementation, the example content request system 200 of FIG. 2 can be used to implement the process 900.

Stage 902 estimates performance of an unselected advertisement. For example, the performance monitor 212 can estimate the performance of an unselected advertisement (a candidate advertisement) stored in the content data store 206. Candidate advertisements for evaluation can, for example, be selected based on document context, or based on a search for advertisements that are deemed relevant to the selected advertisements.

If an estimated performance exceeds a threshold, then the process returns to stage 902. If an estimated performance does not exceed a threshold, then stage 906 substitutes the unselected advertisement for a selected advertisement. For example, the optimization engine 216 can select an unselected advertisement having a performance estimate that exceeds the threshold, and can substitute the unselected advertisement for the selected advertisement that is not performing at at least the threshold level.

FIG. 10 is a flow diagram of an example process 1000 for presenting multiple content items associated with a single slot. In one example implementation, the example content request system 200 of FIG. 2 can be used to implement the process 1000. Stage 1002 provides a content definition for delivery to a user upon receipt of a request from a user for the content associated with the content definition. For example, the content selection module 204 can be used to provide the content definition for delivery to a user through the user interface 300.

Stage 1004 defines two or more content items to be associated with a slot. For example, the content selection module 204 can define two or more content items to be associated with an advertisement slot.

Stage 1006 presents two or more content items in the slot over a time period according to a rotation schedule. For example, the serving engine 210 can present the two or more content items in the advertisement slot according to a sequence criterion.

FIG. 11 is a flow diagram of another example process 1100 for optimizing the selection of content items. In one example implementation, the example content request system 200 of FIG. 2 can be used to implement the process 1100.

Stage 1102 determines a candidate content item and associated performance parameter. For example, the performance monitor 212 can determine a candidate content item and associated performance parameter.

Stage 1106 determines a performance of one or more existing content items. For example, the performance monitor 212 can determine the performance of one or more existing content items served by the serving engine 210.

Stage 1108 compares the performance of the candidate content item to the performance of an existing content item. For example, the performance monitor 212 can compare the performance of the candidate content item to the performance of an existing content item.

Stage 1100 substitutes the candidate content item if the performance of the candidate content item exceeds the performance of the existing content item. For example, the optimization engine 216 can substitute the candidate content item if the performance of the candidate content item exceeds the performance of the existing content item.

Figure 12:
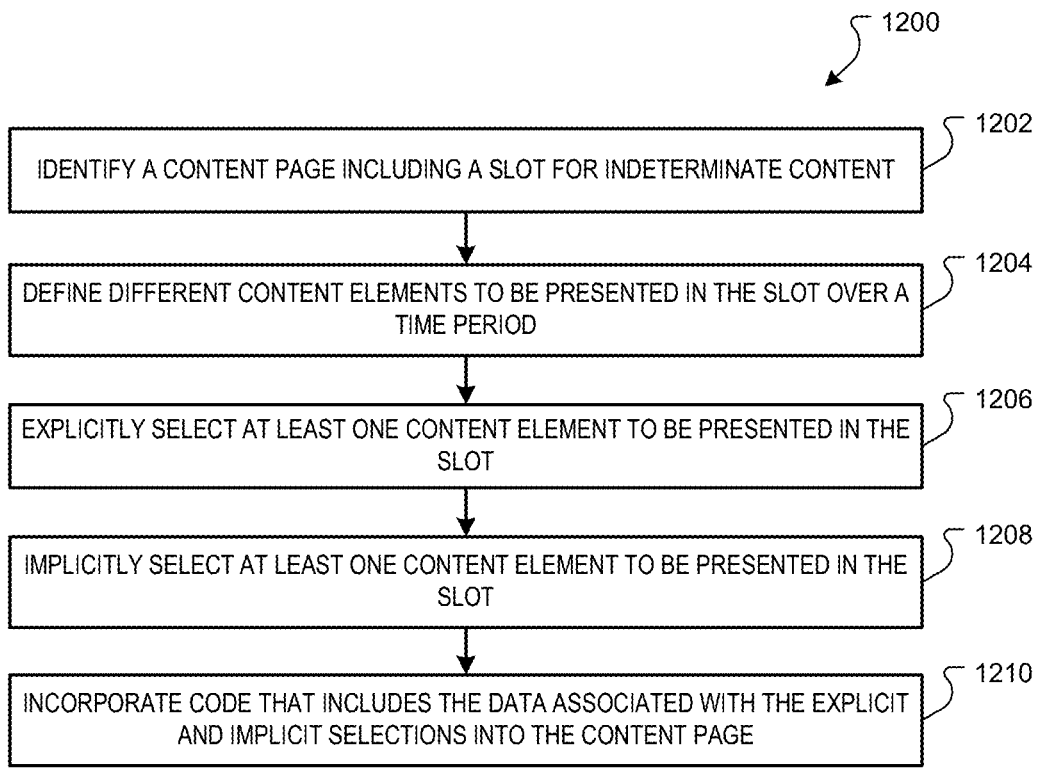
FIG. 12 is a flow diagram of another example process for generating content request code in a document.

FIG. 12 is a flow diagram of another example process 1200 for generating content request code in a document. In one example implementation, execution of the user interface code 202 or the user interface 300 of FIG. 3 can be used to implement the process 1200.

Stage 1202 identifies a content page including a slot for indeterminate content. For example, a publisher 102 can identify a content page including a slot for indeterminate content through the user interface 300.

Stage 1204 defines different content elements to be presented in the slot over a time period. For example, a publisher 102 can define different content elements to be presented in the slot over a time period through the user interface 300.

Stage 1206 explicitly selects at least one content element to be presented in the slot. For example, a publisher 102 can explicitly select at least one content element to be presented in the slot through the user interface 300.

Stage 1208 implicitly selects at least one content element to be presented in the slot. For example, a publisher 102 can implicitly select at least one content element to be presented in the slot through the user interface 300.

Stage 1210 incorporates code that includes the data associated with the explicit and implicit selections into the content page. For example, a publisher 102 can incorporate code that includes the data associated with the explicit and implicit selections into the content page and that is provided to the publisher 102 through the user interface 300

Figure 13:
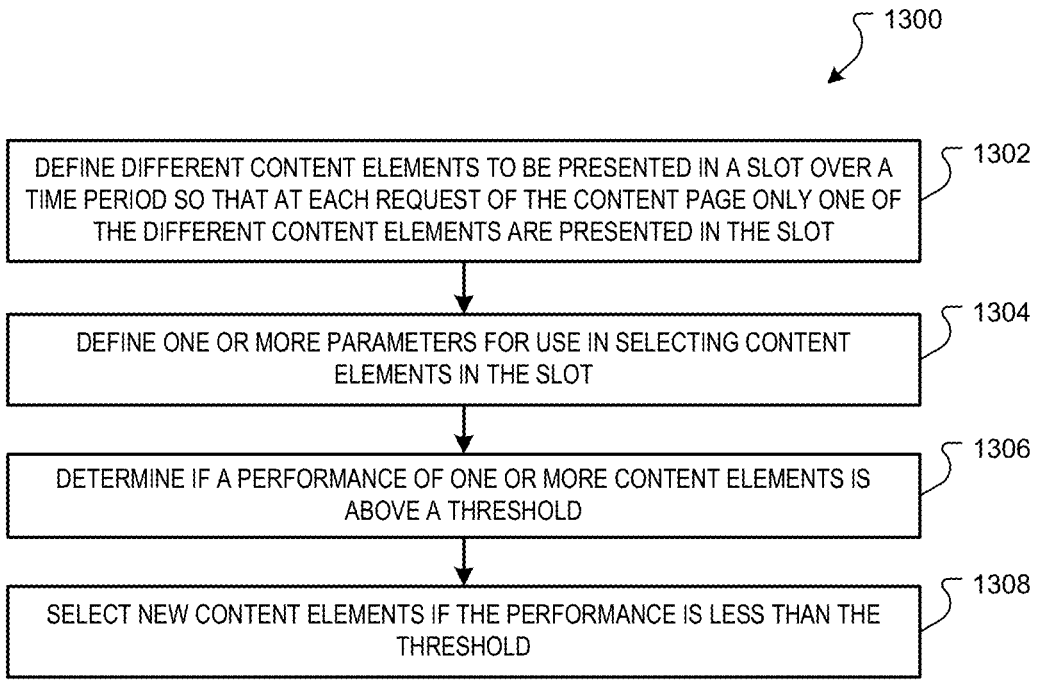
FIG. 13 is a flow diagram of another example process for optimizing the selection of content items.

FIG. 13 is a flow diagram of another example process 1300 for optimizing the selection of content items. In one example implementation, the example content request system 200 of FIG. 2 can be used to implement the process 1300.

Stage 1302 defines different content elements to be presented in a slot over a time period so that at each request of the content page only one of the different content elements is presented in the slot. For example, the content selection module 204 can, based on a user input, define different content elements to be presented in a slot over a time period so that at each request of the content page only one of the different content elements are presented in the slot.

Stage 1304 defines one or more parameters for use in selecting content elements in the slot. For example, the content selection module 204 can, based on a user input, define one or more parameters for use in selecting content elements in the slot.

Stage 1306 determines if a performance of one or more content elements is above a threshold. For example, the performance monitor 212 can determine if a performance of one or more content elements is above a threshold.

Stage 1308 selects one or more new content elements if the performance is less than the threshold. For example, the optimization engine 216 can select new content elements if the performance is less than the threshold.

FIG. 14 is a screenshot of another example content management user interface 1400. The user interface 1400 can, for example, be generated in response to executing the user interface code 202 of FIG. 2 and presented to a publisher of content for specification of selection parameters for a content item environment.

A geographic selection menu 1402 can be utilized to show referrals, e.g., advertisements or some other content items, available by country. A language selection menu 1404 can be utilized to filter the content items according to a particular language.

A search environment 1406 can be utilized to search for particular content items. In one example implementation, the search environment 1406 provides for a user to input a product name or keyword. For example, inputting the term "XYA" will search for content items having the keyword XYA or products branded "XYA."

A browse environment 1408 can, for example, provide a user to browse content items by a particular vertical. For example, selecting the "Finance" vertical can provide 52 content items to the user for review.

A top content item region 1410 can, for example, present a highly ranked content item for documents having similar content to the publisher document 108 in which the subject content item environment is being processed.

A new content item region 1412 can, for example, present a new content item deemed to be relevant in the context of the publisher document 108 in which the subject content item environment is being processed.

A selected content item window 1420 can, for example, present content items either explicitly or implicitly selected by the user. In one implementation, a format selection menu 1422 can select a format of a content item if multiple formats are available, or can filter content items according to a format type. A channel selection menu 1424 can, for example, select a reporting channel for a content item server.

A "Get Code" command button 1426 can, for example, generate content request code based on the explicitly and implicitly defined content items.

Figure 15:
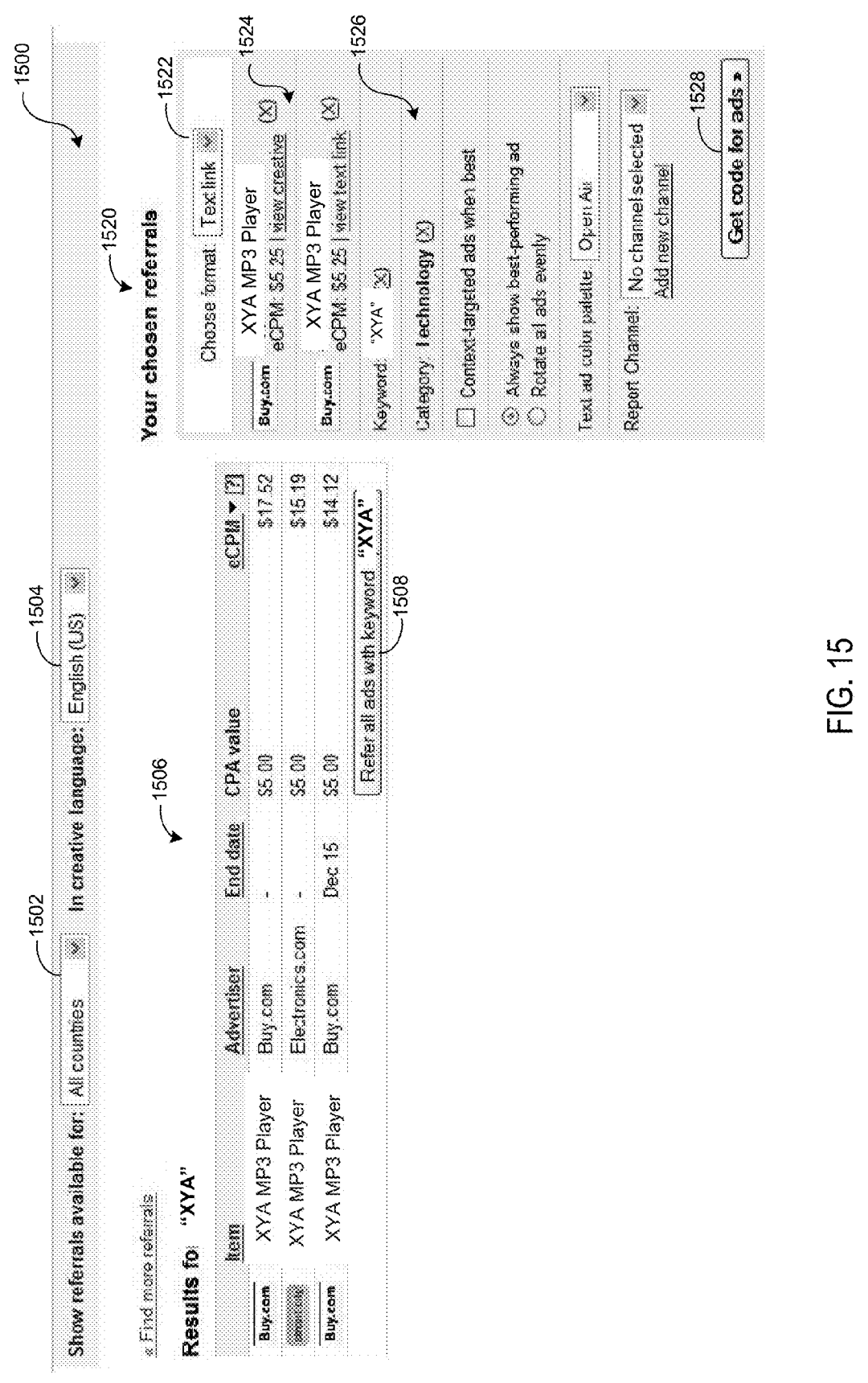

FIG. 15 is a screenshot of another example content management user interface 1500. The user interface 1500 can, for example, be generated in response to executing the user interface code 202 of FIG. 2 and presented to a publisher of content for specification of selection parameters for a content item environment. The user interface 1500 can, for example, be instantiated in response to conducting a content item search in the user interface 1400. For example, the user interface 1500 can be instantiated to display the results of a search conducted on the keyword "XYA."

A geographic selection menu 1502 can be utilized to show referrals, e.g., advertisements or some other content item, available by country. A language selection menu 1504 can be utilized to filter the content item according to a particular language.

A search results region 1506 can, for example, display the search results of a search based on a keyword or product name. A referral button 1508 can, for example, be used to accept all content items displayed in the search results region 1506. For example, selecting the referral button 1508 can associate all of the content items, e.g., advertisements, displayed in the search results window 1508 with a content item environment, e.g., an advertisement slot.

A selected content item window 1520 can, for example, present content items either explicitly or implicitly selected by the user. In one implementation, a format selection menu 1522 can select a format of a content item if multiple formats are available, or can filter content items according to a format type.

A selected content item region 1524 can, for example, show selected content items associated with a content item environment. In one implementation, implicit selection parameters 1526 can also be utilized for selecting and serving content items from the selected content items 1524. Example implicit selection parameters include a keyword, e.g., "XYA," a vertical category, e.g., "Technology," an override feature, e.g., enabling the selection of content-targeted advertisements when the content-targeted advertisements are deemed to perform better than the implicitly or explicitly selected content items; and a sequence parameter, e.g., a sequence based on either best-performing content items or an evenly distributed presentation sequence. Other implicit selections parameters can also be used.

A "Get Code" command button 1528 can, for example, generate content request code based on the explicitly and implicitly defined content items.

The disclosed and other embodiments and the functional operations described in this specification can be implemented in digital electronic circuitry, or in computer software, firmware, or hardware, including the structures disclosed in this specification and their structural equivalents, or in combinations of one or more of them. The disclosed and other embodiments can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, the disclosed embodiments can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The disclosed embodiments can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of what is disclosed here, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of what being claims or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understand as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments have been described. Other embodiments are within the scope of the following claims.

What is claimed is:

1. A method comprising:
   receiving publisher selections of advertisements from a plurality of advertisements;
   associating the selected advertisements with an advertisement environment in a document, wherein the advertisement environment is associated with a location in the document for presenting one or more advertisements;
   generating, by one or more processors, an advertisement request code for inclusion in the document, the advertisement request code configured to issue an advertisement request for selection of an advertisement from the selected advertisements for presentation in the advertisement environment;
   evaluating performance metrics for the selected advertisements presented in the advertisement environment;
   determining that the selected advertisements do not meet a performance threshold;
   in response to determining that the selected advertisements do not meet the performance threshold, optimizing the selection of selected advertisements based on the performance metrics comprising overriding the publisher selections;
   substituting a selected advertisement with a candidate advertisement of a plurality of candidate advertisements, wherein the candidate advertisements are different than the selected advertisements; and
   providing the candidate advertisement instead of the selected advertisement to a client device for rendering in the advertisement environment of the document.

2. The method of claim 1, wherein the performance metrics include a click-through rate or a conversion rate.

3. The method of claim 1, further comprising:
   estimating performance metrics for a plurality of candidate advertisements; and
   identifying a candidate advertisement from the plurality of candidate advertisements with performance metrics greater than a performance threshold.

4. The method of claim 3, comprising:
   identifying a plurality of candidate advertisements based on a context of the document or advertisements related to the selected advertisements.

5. A computer program product stored on a computer storage device comprising instructions that when executed by one or more processors cause the processors to perform operations comprising:
   receiving publisher selections of advertisements from a plurality of advertisements;
   associating the selected advertisements with an advertisement environment in a document, wherein the advertisement environment is associated with a location in the document for presenting one or more advertisements;

generating, by one or more processors, an advertisement request code for inclusion in the document, the advertisement request code configured to issue an advertisement request for selection of an advertisement from the selected advertisements for presentation in the advertisement environment;

evaluating performance metrics for the selected advertisements presented in the advertisement environment;

determining that the selected advertisements do not meet a performance threshold;

in response to determining that the selected advertisements do not meet the performance threshold, optimizing the selection of selected advertisements based on the performance metrics comprising overriding the publisher selections;

substituting a selected advertisement with a candidate advertisement of a plurality of candidate advertisements, wherein the candidate advertisements are different than the selected advertisements; and providing the candidate advertisement instead of the selected advertisement to a client device for rendering in the advertisement environment of the document.

6. The computer program product of claim 5, wherein the performance metrics include a click-through rate, or a conversion rate.

7. The computer program product of claim 5, wherein the operations further comprise:

estimating performance metrics for a plurality of candidate advertisements; and identifying a candidate advertisement from the plurality of candidate advertisements with performance metrics greater than a performance threshold.

8. The computer program product of claim 7, wherein the instructions comprise:

identifying a plurality of candidate advertisements based on a context of the document or advertisements related to the selected advertisements.

9. A system comprising:

one or more computers and one or more storage devices storing instructions that are operable, when executed by the one or more computers, to cause the one or more computers to perform operations comprising:

receiving publisher selections of advertisements from a plurality of advertisements;

associating the selected advertisements with an advertisement environment in a document, wherein the advertisement environment is associated with a location in the document for presenting one or more advertisements;

generating, by one or more processors, an advertisement request code for inclusion in the document, the advertisement request code configured to issue an advertisement request for selection of an advertisement from the selected advertisements for presentation in the advertisement environment;

evaluating performance metrics for the selected advertisements presented in the advertisement environment;

determining that the selected advertisements do not meet a performance threshold;

in response to determining that the selected advertisements do not meet the performance threshold, optimizing the selection of selected advertisements based on the performance metrics comprising overriding the publisher selections;

substituting a selected advertisement with a candidate advertisement of a plurality of candidate advertisements, wherein the candidate advertisements are different than the selected advertisements; and providing the candidate advertisement instead of the selected advertisement to a client device for rendering in the advertisement environment of the document.

10. The system of claim 9, wherein the performance metrics include a click-through rate, or a conversion rate.

11. The system of claim 9, wherein the operations further comprise:

estimating performance metrics for a plurality of candidate advertisements; and identifying a candidate advertisement from the plurality of candidate advertisements with performance metrics greater than a performance threshold.

12. The system of claim 11, wherein the instructions comprise:

identifying a plurality of candidate advertisements based on a context of the document or advertisements related to the selected advertisements.

* * * * *